United States Patent
Rabipour et al.

(10) Patent No.: US 7,076,316 B2
(45) Date of Patent: Jul. 11, 2006

(54) METHOD AND APPARATUS FOR CONTROLLING AN OPERATIVE SETTING OF A COMMUNICATIONS LINK

(75) Inventors: Rafi Rabipour, Côte St-Luc (CA); Chung Cheung Chu, Brossard (CA); Paul Coverdale, Nepean (CA)

(73) Assignee: Nortel Networks Limited, Nepean (CA)

(*) Notice: Subject to any disclaimer, the term of this patent is extended or adjusted under 35 U.S.C. 154(b) by 952 days.

(21) Appl. No.: 09/859,640

(22) Filed: May 18, 2001

(65) Prior Publication Data

US 2002/0107593 A1 Aug. 8, 2002

Related U.S. Application Data

(60) Provisional application No. 60/266,404, filed on Feb. 2, 2001.

(51) Int. Cl.
*G06F 17/00* (2006.01)
*H04M 1/24* (2006.01)

(52) U.S. Cl. .................. 700/94; 379/1.01; 379/1.03
(58) Field of Classification Search ............ 700/94; 370/395.21, 395.4; 455/452.2; 379/1.01, 379/1.02, 1.03, 3, 406.01–406.16
See application file for complete search history.

(56) References Cited

U.S. PATENT DOCUMENTS

| | | | |
|---|---|---|---|
| 5,715,372 A * | 2/1998 | Meyers et al. ............... 706/16 |
| 5,768,308 A * | 6/1998 | Pon et al. .................... 375/219 |
| 5,903,862 A | 5/1999 | Weaver, Jr. et al. |
| 5,956,673 A | 9/1999 | Weaver, Jr. et al. |
| 6,134,242 A | 10/2000 | Aftelak |
| 6,275,797 B1 * | 8/2001 | Randic ........................ 704/233 |
| 6,304,637 B1 * | 10/2001 | Mirashrafi et al. ....... 379/88.17 |
| 6,466,548 B1 * | 10/2002 | Fitzgerald .................... 370/249 |
| 6,574,469 B1 * | 6/2003 | Xiang et al. ................. 455/416 |
| 6,728,672 B1 * | 4/2004 | Will ............................. 704/233 |
| 6,766,291 B1 * | 7/2004 | Chu et al. .................... 704/215 |

FOREIGN PATENT DOCUMENTS

| | | |
|---|---|---|
| EP | 0 909 081 A2 | 1/1999 |
| EP | 1 061 753 A2 | 12/2000 |
| GB | 2226718 A * | 7/1990 |
| WO | WO 95/22818 | 8/1995 |

OTHER PUBLICATIONS

International Search Report PCT/CA02/00036; Jan. 10, 2002.
International Preliminary Examination Report PCT/CA02/00036; Jan. 10, 2002.
Written opinion PCT/CA02/00036; Jan. 10, 2002.
Patent Abstract of Japan, vol. 014. No. 168 (E-0912), Mar. 30, 1990; JP 02025/94A; (Fujitsu Ltd.), Jan. 26, 1990.

* cited by examiner

*Primary Examiner*—Huyen Le
*Assistant Examiner*—Andrew C. Flanders

(57) ABSTRACT

A method and apparatus for controlling an operative setting of a communications link is provided. The communications link is capable of acquiring a plurality of operative settings. Audio quality in the communications link under different operative settings is compared and an operative setting is selected at least in part on the basis of this comparison. A control signal is sent to at least one component in the communications link to cause the communications link to attempt to acquire the selected setting.

40 Claims, 7 Drawing Sheets

METHOD AND APPARATUS FOR CONTROLLING AN OPERATIVE SETTING OF A COMMUNICATIONS LINK

This is a formalization of provisional application No.60/266,404 filed Feb. 2, 2001.

FIELD OF THE INVENTION

This invention relates to a method and to an apparatus for transmitting digitized voice signals in a communications environment that can be of a wireless nature or of a wire-line nature. More specifically, it relates to a method and to an apparatus for improving the quality of an audio signal by controlling the operative setting of the communications link transporting the audio signal.

BACKGROUND OF THE INVENTION

In recent years, the telecommunications industry has witnessed the proliferation of vocoders in order to meet bandwidth demands of different wireline and wireless communications systems. The name <<vocoder>> stems from the fact that its applications are specific to the encoding and decoding of voice signals primarily. Vocoders are usually integrated in mobile telephones and the base stations of the communications network. They provide speech compression of a digitized voice \signal as well as the reverse transformation. Thus a vocoder includes an encoder stage that will accept as input a digitized voice signal and output a compressed signal. As for the reverse transformation the vocoder is provided with a decoder stage that will accept the compressed speech signal and output a digitized signal, such as PCM samples.

The main advantage of compressing speech is that it uses less of the limited available link bandwidth for transmission. The main disadvantage is loss of speech quality.

The rapid growth in the diversity of networks and the number of users of such networks is increasing the number of instances where two vocoders are placed in tandem to serve a single connection. In such a case, a first encoder is used to compress the speech of the first mobile user. The compressed speech is transmitted to a base station serving the local mobile where it is decompressed (converted to PCM format samples). The resulting PCM samples arrive at the base station serving the second mobile terminal, over the digital trunk of the communication network, where a second encoder is used to compress the input signal for transmission to the second mobile terminal. A speech decoder at the second mobile terminal decompresses the received compressed speech data to synthesize the original speech signal from the first mobile terminal.

It is well known that tandem of speech codecs usually degrades the voice quality and increases the transmission delay over a communications link. In an attempt to eliminate the condition of vocoder tandeming in a communications link between the first mobile terminal and the second mobile terminal, a method called <<bypass>> has been proposed in the past. The bypass mechanism allows a communications link between the first mobile terminal and the second mobile terminal to acquire different settings namely an active setting and a bypass setting. In use, a digital signal processor associated with the first base station that receives the RF signal from a first mobile terminal determines, through signaling and control that an interoperable codec exists at the second base station associated with the mobile terminal at which the call is directed. The digital signal processor associated with the first base station rather than converting the compressed speech signals into PCM samples invokes the bypass mechanism which sets the communications link in the bypass setting and outputs the compressed speech in the network towards the second base station. The compressed speech signal, when arriving at the digital signal processor associated with the second base station is routed such as to bypass the local vocoder. Decompression of the signal occurs only at the second mobile terminal. Tandem free operation (TFO) standard, such as TIA/EIA-829, GSM 08.62 have been developed to allow the removal of intermediate compression/decompression stages in the base stations.

The communications link between the first and second mobile terminals frequently includes functional processing stages providing audio processing operations for improving the audio quality of an uncompressed signal. Examples of such audio processing operations include echo cancellation, level adjustment and noise reduction among others. Such functional processing operations may be located within the base stations or in locations in between the base stations. In general such processing operations can only be applied to a decompressed audio signal and as such cannot be applied when the communications link is in the bypass setting. Depending on the nature and the configuration of the call, the omission of these processing operations can at times reduce the overall quality of service by a larger amount than the voice quality gained due to the removal of tandem codecs. Consequently, a deficiency in the above-described bypass method is that in certain cases the bypass mechanism may result in an overall reduction in the quality of the audio signal.

Consequently, there is a need in the industry for providing a method and apparatus for controlling an operative setting of a communications link that at least in part alleviates the problems associated with the prior art.

SUMMARY OF THE INVENTION

In accordance with a broad aspect, the invention provides a method for controlling an operative setting of a communications link, the communications link being capable of acquiring a plurality of operative settings. The method comprises comparing audio quality in the communications link under different operative settings and selecting an operative setting at least in part on the basis of the comparison. The method also includes sending a control signal to at least one component in the communications link to cause the communications link to attempt to acquire the selected setting.

In a non-limiting example, the audio quality under a given operative setting used during the comparison is the actual audio quality of the communications link under that given operative setting. This may be effected by causing the components in the communications link to acquire the different operative settings and to provide data elements indicative of the audio quality under these settings.

In an alternative non-limiting example, the audio quality under a given operative setting used during the comparison is an estimate of the audio quality of the communications link under that given operative setting. This may be effected by providing parameters indicative of the effectiveness of the components in the communications link under the different operative settings.

Advantageously, the above-described method allows the setting of the communications link to be dynamically determined at least in part on the basis of the audio quality associated with each respective operative setting. In a non-limiting example, the setting providing the most desirable audio quality is selected.

In a non-limiting example of implementation, a measurement of a certain characteristic of an audio signal is derived for each respective operative setting of the communications link. The certain characteristic characterizes at least in part audio quality as indicated by measure of the echo, measure of delay, the signal level, the noise or a measure of the information loss among others. The measurements of the certain characteristic are then compared to select an operative setting.

In another non-limiting example of implementation, measurements are derived for a set of certain characteristic for each respective operative setting of the communication link. The measurements derived are then used to select an operative setting.

In a specific example of implementation, the communications link is capable of acquiring two operative settings namely a bypass setting and an active setting. When in the bypass setting, the communications link transmits an audio signal substantially unaltered and, when in the active setting, the communications link transmits an audio signal subsequent to at least one processing operation on the audio signal. The processing operation may include for example echo cancellation, signal level adjustment, noise conditioning and noise reduction among others. In a non-limiting example, selecting between the active (tandem) operative setting and the bypass (tandem free) operative setting includes an evaluation of the trade-off between the amount of additional degradation in the audio signal quality due to tandemming (delay, distortion, etc.) versus that due resulting from the omission of applying signal processing operations (background noise, echo etc.).

The method comprises providing a data element indicative of a measure of effectiveness associated with the processing operation on the audio signal and selecting the setting at least in part on the basis of the measure of effectiveness. The measure of effectiveness is used to assess a degree of improvement in audio quality over an audio quality associated with the bypass setting.

In a non-limiting example of implementation, the active operative setting is selected when the measure of effectiveness is above a certain threshold of effectiveness.

The above-described method can also be applied to a communications link comprising a plurality of components. In this case, a control signal is sent to the plurality of components in the communications link to cause the communications link to acquire the selected setting. The communications link may be a uni-directional link or a bi-directional link. In a bi-directional link, the operative settings in the two directions need not be the same and may be independently selected.

In accordance with another broad aspect, the invention further provides an apparatus implementing the above-described method.

In accordance with another broad aspect, the invention provides a computer readable medium comprising a program element suitable for execution by a computing apparatus for implementing the above-described method.

In accordance with another broad aspect, the invention provides an apparatus for controlling an operative setting of a communications link, the communications link being capable of acquiring two operative settings namely a bypass setting and an active setting. When in the bypass setting, the communications link transmits an audio signal substantially unaltered and, when in the active setting, the communications link transmits an audio signal subsequent to at least one processing operation on the audio signal. The apparatus receives data elements indicative of the effectiveness of the processing operation on the audio signal at an input. A processing unit selects an operative setting at least in part on the basis of the data elements received at the input and generates a control data element suitable for causing the communications link to acquire the selected setting. A control signal indicative of the control data element is released to at least one component in the communications link for causing the communications link to acquire the selected setting.

In a non-limiting implementation, the processing operation is selected from the set consisting of echo cancellation, noise reduction, noise conditioning and signal level adjustment.

In accordance with another broad aspect, the invention provides an apparatus for selectively enabling and disabling tandem-free operation of a communications link. The communications link comprises at least one functional stage operative to implement at least one processing operation on an audio signal, during tandem-free operation the functional stage being disabled. The apparatus receives data elements indicative of an effectiveness of the at least one processing operation on the audio signal. A processing unit processes the data element to generate a control data element suitable for causing the communications link to selectively enable tandem-free operation of the communications link. At an output, a control signal is released in the communications link such as to allow selectively enabling tandem-free operation on the communications link, the control signal being indicative of the control data element.

Other aspects and features of the present invention will become apparent to those ordinarily skilled in the art upon review of the following description of specific embodiments of the invention in conjunction with the accompanying figures.

DETAILED DESCRIPTION

The specific example of implementation described pertains to a wireless communications network. It is to be expressly understood that the invention is also applicable to Fixed Wireless Networks, wire-line networks and packet voice networks (VoIP).

Figure 1:
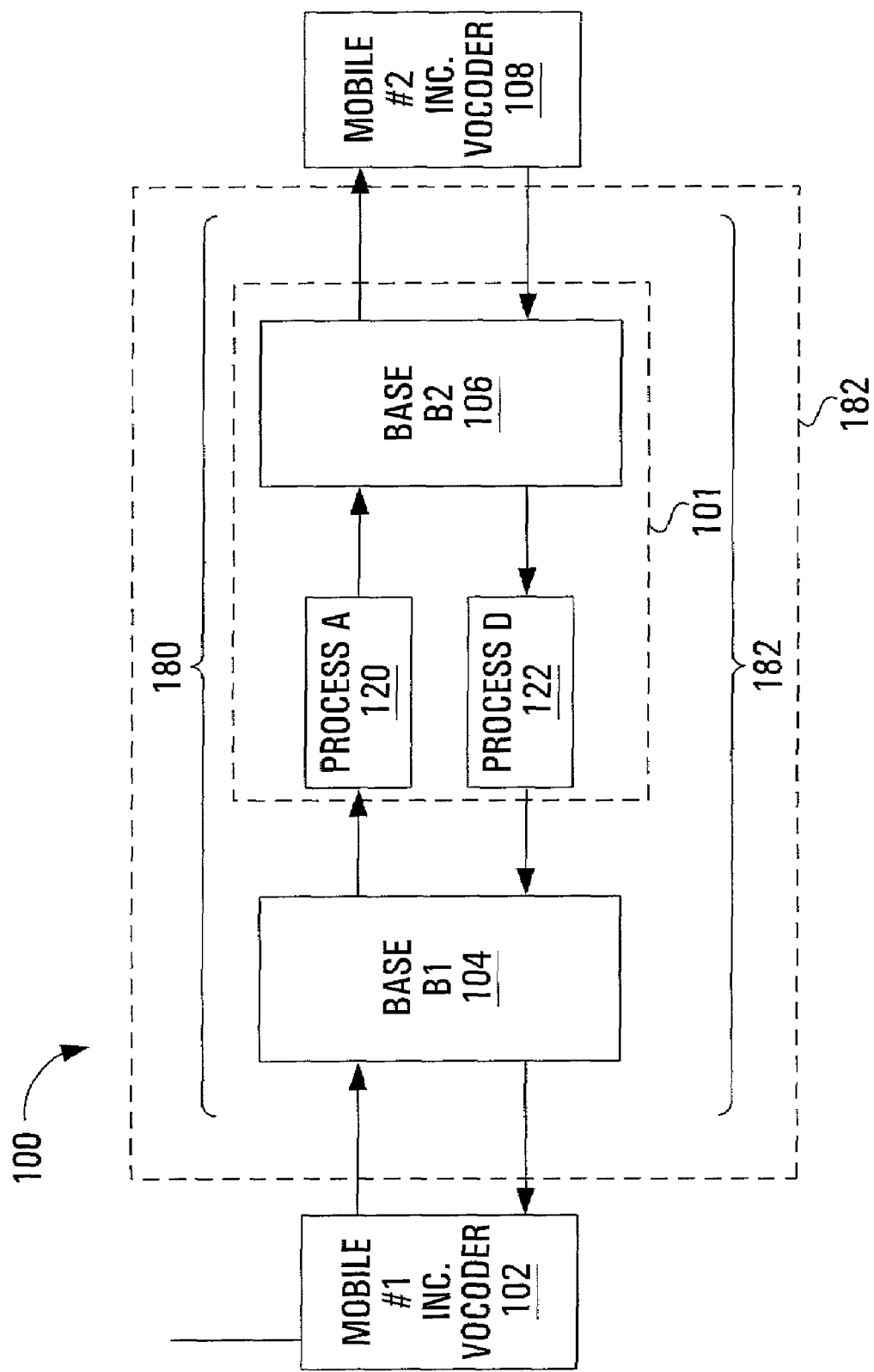
FIG. 1 is a block diagram of a communications network including a specific example of implementation of the invention.

FIG. 1 of the drawings depicts a schematic diagram of a specific example of a communications network 100 comprising a plurality of communications network elements 102 104 106 108. Communications network elements 102 and 108 are wireless mobile terminals and communications network elements 104 and 106 are base stations. The two wireless mobile terminals 102 and 108 communicate with one another through base stations 104 106 over a forward communications link 180 and a reverse communication link 182. The communications links 180 182 may be a wireless link, a wire-line link or may be a combination or a wireless and wire-line link. In the forward communications link 180, signals travel from the first mobile terminal 102 to the second mobile terminal 108 and in the reverse communications link 182, signals travel from the second mobile terminal 108 to the first mobile terminal 102. The forward communications link 180 also includes signal processing entity A 120 between the base stations 104 106 and the reverse communications link 182 includes signal processing entity D 122 between base stations 104 106.

The communications links 180 182 are operative to acquire a plurality of operative settings. Each operative setting applies respective audio signal processing operations to audio signals carried over the communications links. In the specific example of implementation described herein below, communications links 180 182 are operative to acquire two operative settings namely a bypass setting (tandem free operative setting) and an active setting (tandem operative setting) When in the bypass setting (tandem free operative setting), an audio signal is transmitted substantially unaltered over the communications link, and when in the active setting (tandem operative setting) an audio signal is transmitted over the communications links subsequent to at least one processing operation on the audio signal. In addition, in the active operative setting, the vocoders present in the base station 104 106 perform their encoder/decoder operations on the audio signals carried over the communications links 180 182.

Figure 2:
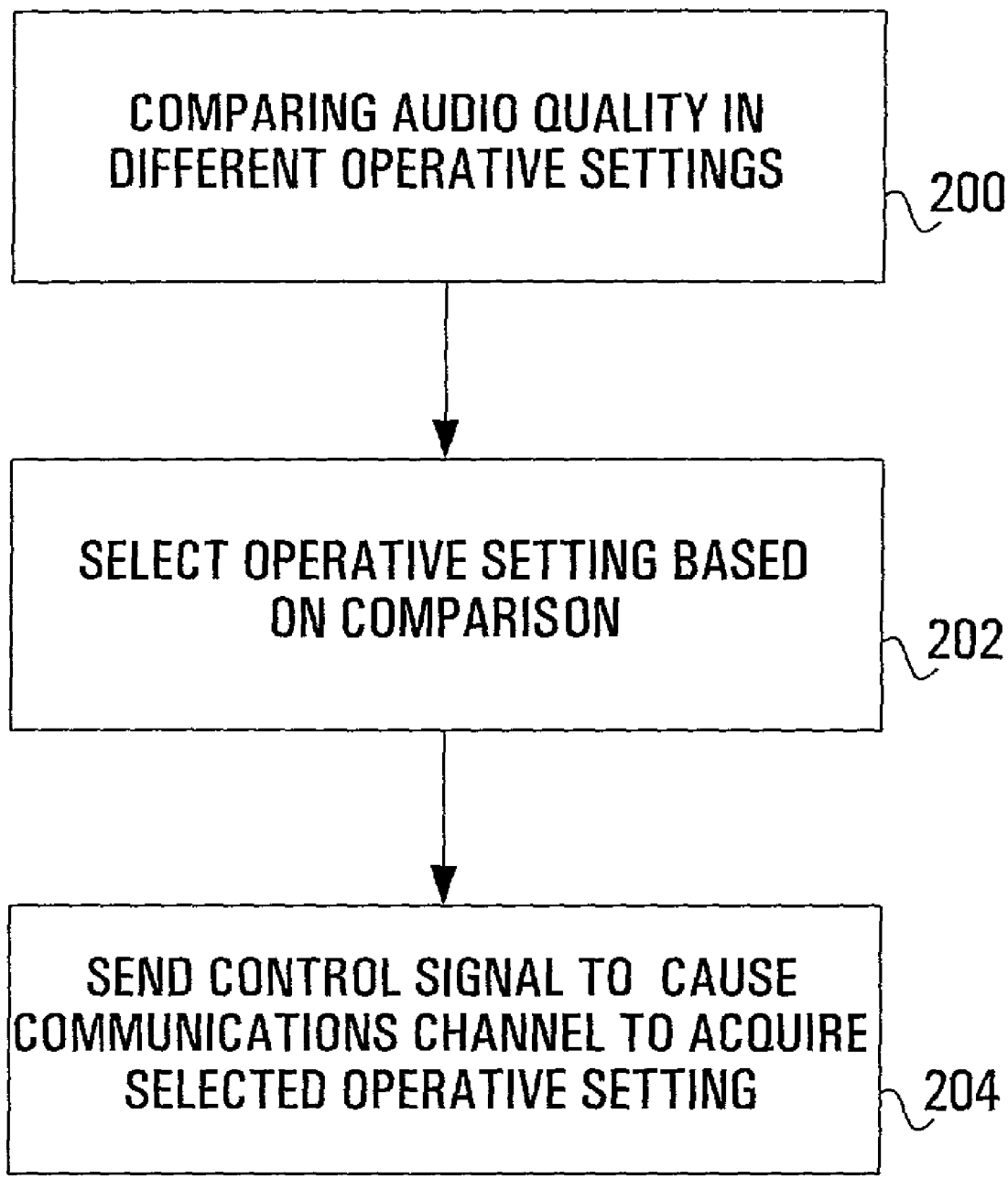
FIG. 2 is a flow diagram depicting a process for controlling an operative setting of a communications link in accordance with a specific example of implementation of the invention.

The method for controlling an operative setting of a communications link will now be described with reference to FIG. 2 of the drawings. It will be readily appreciated that the operative setting of the forward communications link 180 may be jointly set with that of the reverse communications link 182 such that the forward and reverse communications links have the same operative setting. In this case, audio quality of both communications links 180 182 is considered in the selection of the operative setting. Alternatively, the operative setting of the forward communications link 180 may be independently set from that of the reverse communications link 182. In this alternate case, audio quality of the communications link 180 is considered in the selection of its operative setting and the audio quality of communications link 182 is considered in the selection of its operative setting. For the purpose of simplicity, the description will consider a specific example of implementation where the operative setting of the forward and reverse communications links are independently set. However, it is to be understood that forward and reverse communications links having jointly selected operative settings are within the scope of the invention.

At step 200, the audio quality of the signal when the respective communications links 180 182 are under different operative settings is compared. The comparison may be effected on the basis of objective measures or may be based on subjective or heuristic measures and are based on the processing operation being considered.

In a first specific example of implementation, this is effected by deriving actual measurements of characteristics of the audio signal for respective operative settings. The characteristics may include for example echo, signal level, delay, information loss and noise among others. The measurements under the different operative settings are then compared against one another and against reference values associated with respective characteristics.

In a second specific example of implementation, step 200 is effected by deriving measurements of characteristics of the audio signal under the different operative settings and making use of data elements indicative of the effectiveness of the respective signal processing operations present in the active operative setting. Quality measurements are then derived for the different operative settings and are compared against one another. The operative setting having a quality measurement indicative of an improvement in audio quality relative to the audio quality associated to respective other operative settings.

Specific examples of implementation of the comparison effected at step 200 will be described in greater detail later on in this specification.

At step 202, an operative setting is selected on the basis of the comparison effected at step 200. At step 204, a control signal is sent to at least one network element in the communications link 180 to cause the communications link 180 to acquire the selected setting.

The structure and functioning of communications network will now be described with reference to FIGS. 1 and 3 of the drawings.

Figure 3:
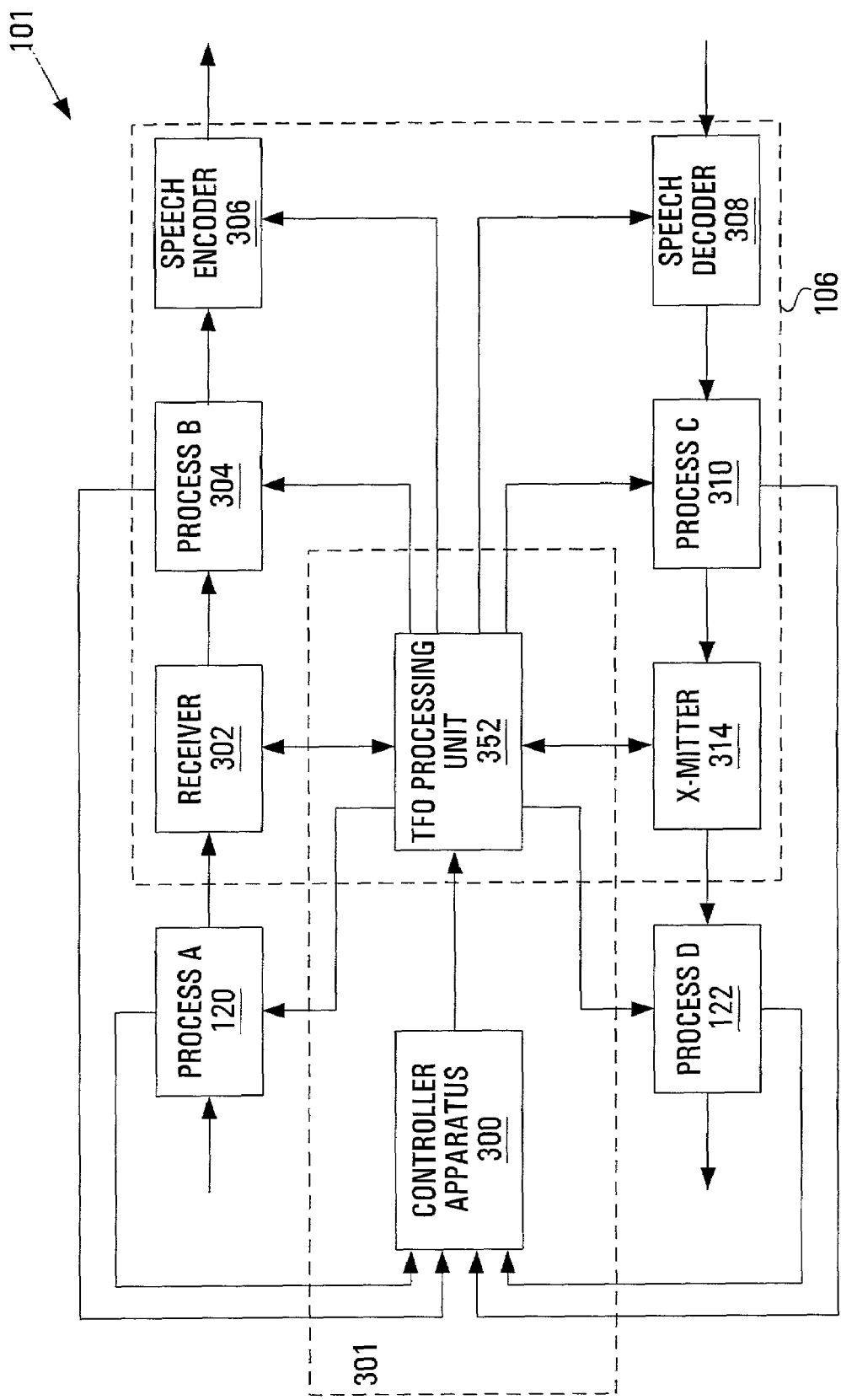
FIG. 3 is a block diagram of a portion of the communications network of FIG. 1 including an apparatus for controlling an operative setting of a communications link in accordance with a specific example of implementation of the invention.

The part of FIG. 1 identified as 101 is shown in greater detail in FIG. 3. FIG. 3 shows a more detailed view of the base station 106 and of the signal processing entities 120 and 122. Base station 104 is functionally similar to base station 106 and as such will not be described. As shown, the base station 106 also includes a set of signal processing entities 304 310, an encoder module 306, a decoder module 308, a bypass receiver unit 302, a bypass transmitter unit 314 and an apparatus 301 for controlling the setting of the communications link 180 182. The signal processing entities 304 and 120 as well as the encoder module 306 are responsive to control signals from apparatus 301 to acquire either one of a bypass setting and an active setting thereby establishing a bypass setting or an active setting on communications link 180. Similarly, signal processing entities 310 and 122 as well as the decoder module 308 are responsive to control signals from apparatus 301 to acquire either one of a bypass setting and an active setting thereby establishing a bypass setting or an active setting on communications link 182. Although the apparatus 301 for controlling the setting of the communications links is shown as a single module controlling the operative setting of the forward communications link 180 and the reverse communications link 182, two separate modules may be used each controlling the operative setting of a respective communications link without detracting from the spirit of the invention.

The encoder and decoder modules 306 308 perform respectively compression and decompression of an audio signal on communications links 180 and 182 respectively. The encoder module 306 is responsive to control signals issued by the apparatus 301 for controlling the setting of the communications link 180 to acquire a bypass setting or an active setting. The decoder module 308 is responsive to control signals issued by the apparatus 301 for controlling the setting of the communications link 182 to acquire a bypass setting or an active setting. When in the bypass setting, an audio signal is transmitted substantially unaltered by the modules 306 308, and when in the active setting an audio signal is transmitted after compression by the encoder modules 306 or after decompression by the decoder module 308.

The bypass receiver unit 302 handles the communication aspects of the bypass setting, also designated as the tandem free operation over the forward communication link 180 and provides the apparatus 301 with messages pertaining to the establishment of the bypass setting on the forward communications link.

The bypass transmitter unit 314 handles the communication aspects of the bypass operative setting, also designated as the tandem free operation over the reverse communication link 182. The transmitter unit 314 issues under the control of the apparatus 301 messages pertaining to the establishment of the bypass setting on the reverse communications link.

Signal processing entities A 120 and B 304 implement functional processing operations affecting uncompressed audio signals on the forward communication link 180. More specifically entity A 120 represents processing operations effected outside the base station 106 and entity B 304 represents processing operations effected inside the base station 106. Entities C 310 and D 122 represent signal processing units operative for implementing functional processing operations to be applied on an uncompressed audio signal after the speech decoding on the reverse communication link 182. More specifically entity D 122 represents processing operations effected outside the base station 106 and entity C 310 represents processing operations effected inside the base station 106.

Figure 4:
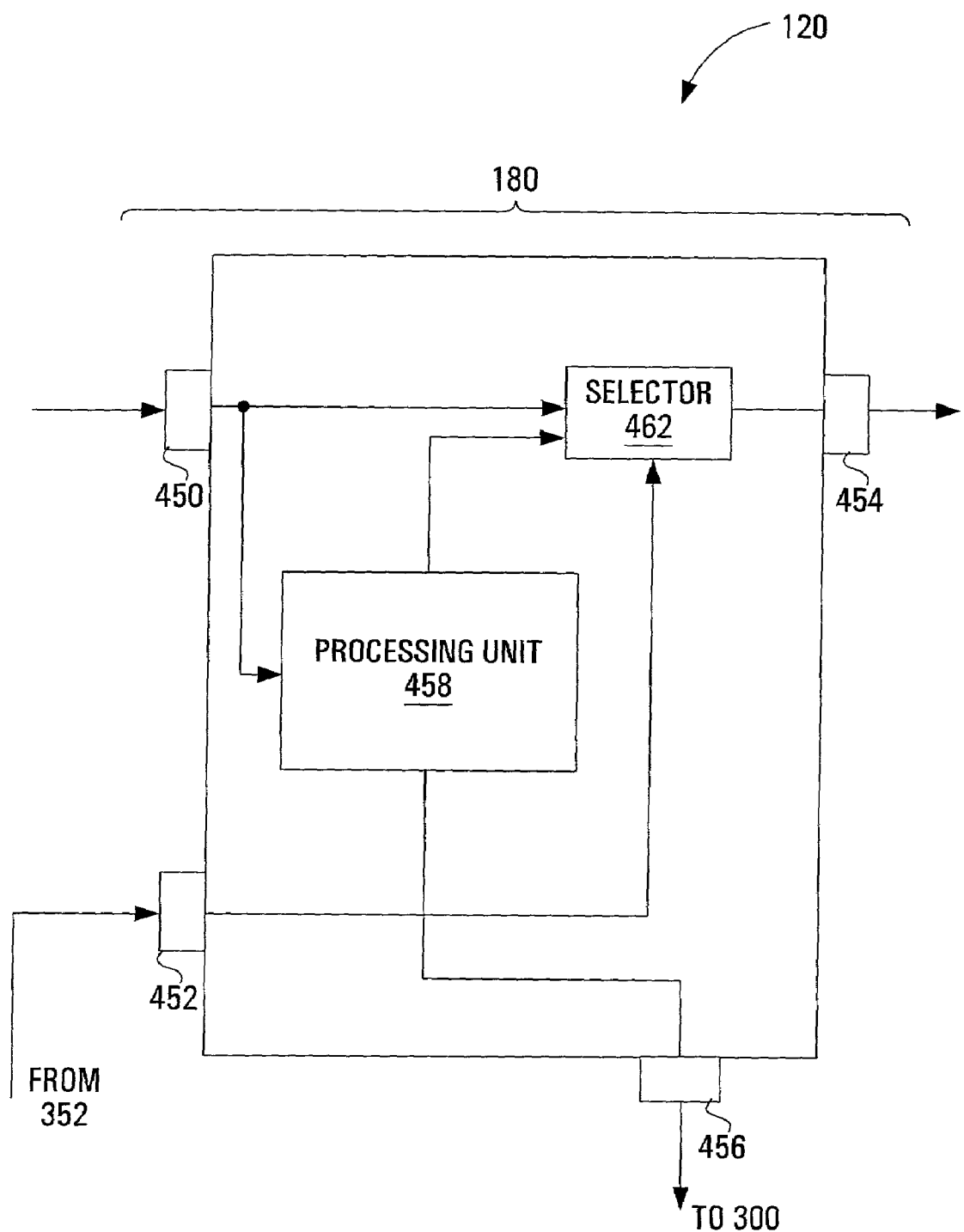
FIG. 4 is a detailed block diagram of a signal processing entity shown in FIG. 3 for processing an audio signal in accordance with a non-limiting example of implementation of the present invention.

Each of the processing entities A 120, B 304, C 310 and D 122 may implement a plurality of signal processing operations. A specific non-limiting example of implementation of signal processing entity A 120 is depicted in FIG. 4. Signal processing entities B 304, C 310 and D 122 have similar configurations to signal processing entity A 120. The signal processing entity A 120 has a first input 450 for receiving an audio signal, a second input 452 for receiving a control signal, a first output 454 for releasing an audio signal and a second output 456 for releasing data elements indicative of characteristics of the audio signal received at the first input 450. The signal processing entity also has functional components including a processing unit 458 and a selector module 462.

The processing unit 458 receives from the first input 450 an audio signal. For the purpose of clarity, the audio signal received at the input 450 will be designated as the pre-processed audio signal. The processing unit 458 processes the pre-processed audio signal to generate a post-processed audio signal. Echo control, level adjustment and noise reduction are examples of signal processing operations that can be effected by the processing unit 458. In general, these processes operate on decompressed speech samples and as such they are not effective when the input signal is compressed. The processing unit 458 releases to the selector unit 462 the post-processed audio signal subsequent to the application of a signal processing operation. The processing unit 458 is further operative for generating a data element indicative of a measurement of audio characteristics of the audio signal received at the input. As a variant, the processing unit is also operative for generating a second data element indicative of characteristics measured on the post-processed signal. Characteristics may include for example a signal to noise ratio (SNR), a measure of the gain used in signal level adjustments, a measure of the information loss, measures of the echo in the signal among others. The measurements of characteristics provide an indication of the audio quality in the communications link when the pre-processed audio signal is selected or when the post-processed audio signal is selected. Alternatively, the measurements of a certain characteristic may be indicative of a measure of the usefulness and/or effectiveness of the processing operation(s) performed by processing unit 458. The measurements of characteristics are released at the second output 456 and directed to the apparatus 301 for controlling the setting of the communications links.

The selector module 462 receives from the first input 450 the pre-processed audio signal, from the processing unit 458 the post-processed audio signal and from the second input 452 the control signal. The selector module 462 is responsive to the control signal to select either one of the pre-processed audio signal and the post-processed audio signal. Although the selector module shown in FIG. 4 can select between two settings, it will be readily appreciated that the selector module 462 may select between more than two settings by providing more than one output from the processing unit 458 and the suitable control signal at the second input 452.

The apparatus 301 for controlling the setting of the communications link 180 is responsive to the messages exchanged over the communications links 180 182 by the bypass receiver 302 and transmitter units 314 and to the data elements indicative of characteristics of the audio signal on the communications link 180 to generate a control signal causing the establishment of either one of a bypass operative setting and an active operative setting on communications link 180. The apparatus 301 is responsive to the messages exchanged over the communications links 180 182 by the bypass receiver 302 and transmitter units 314 and to the data elements indicative of characteristics of the audio signal on the communications link 182 to generate a control signal causing the establishment of either one of a bypass operative setting and an active operative setting on communications link 182. The apparatus 301 for controlling the setting of the communications links comprises a controller apparatus member 300 and a tandem-free operation (TFO) processing unit 352.

The TFO processing unit 352 is responsive to messages exchanged over the communications links 180 182 and to control signals receiving from the controller apparatus member 300 to negotiate with base station 104 (not shown) the establishment of tandem free operation on the communication link 180 182. Such messaging interaction for the establishment of tandem free operation is well-known in the art to which this invention pertains and as such will not be described further. The tandem-free operation (TFO) processing unit 352 is operative to issue control signals to components on the communications links 180 and 182 to cause them to acquire either one of an active operative setting and a bypass operative setting. The control signals is generated on the basis of signaling messages received through the bypass receiver unit 302 and indicating whether tandem free operation can be established over the communications links 180 182 as well as on the basis of the control signal received from the controller apparatus member 300. The control signal received from the controller apparatus member 300 is indicative of the most desirable operative setting. More specifically, if the control signal received from the controller apparatus member 300 is indicative of the bypass operative setting for communications link 180, than the bypass operative setting can be negotiated by the TFO processing unit 352. In this example, tandem free operation (TFO) entities on the communications links 180 182, such as the bypass receiver unit 302, are directed to generate the appropriate signaling to base station 106 to negotiate tandem free operation over the communications links 180 182 with base station 104 using any suitable communication protocol between.

On the other hand, if the control signal received from the controller apparatus member 300 is indicative of the active operative setting for communications link 180, then the establishment of TFO is prevented for communications link 180. In this example, tandem free operation (TFO) entities on the communications link 180, such as the bypass receiver unit 302, are directed to generate the appropriate signaling to base station 106 to either maintain the active operative setting or to cause the establishment of the active operative setting on communications link 180.

The control signals issued by the TFO processing unit 352 are received by the second inputs of the signal processing entities. In the active operative setting, the post-processed audio signal is selected and the speech encoder module 306 and decoder module 308 are operational. In the bypass operative setting the pre-processed audio signal, which is in this specific example is a compressed signal, is selected and the speech encoder module 306 and decoder module 308 are non-operational.

The controller apparatus 300 receives from the set of signal processing entities A 120, B 304, C 310 and D 122 data elements indicative of audio quality in the communications link for the pre-processed audio signal and the post-processed audio signal. Alternatively, the apparatus receives the data elements indicative of measures of usefulness and/or effectiveness of respective processing operations performed by processing entities A 120, B 304, C 310 and D 122. The apparatus 300 is operative for processing the data elements indicative of the audio quality in the communications links 180 182 to generate a control data element for transmission to the TFO processing unit 352 such as to allow the communications links to acquire either one of an active and a bypass operative setting.

Figure 5:
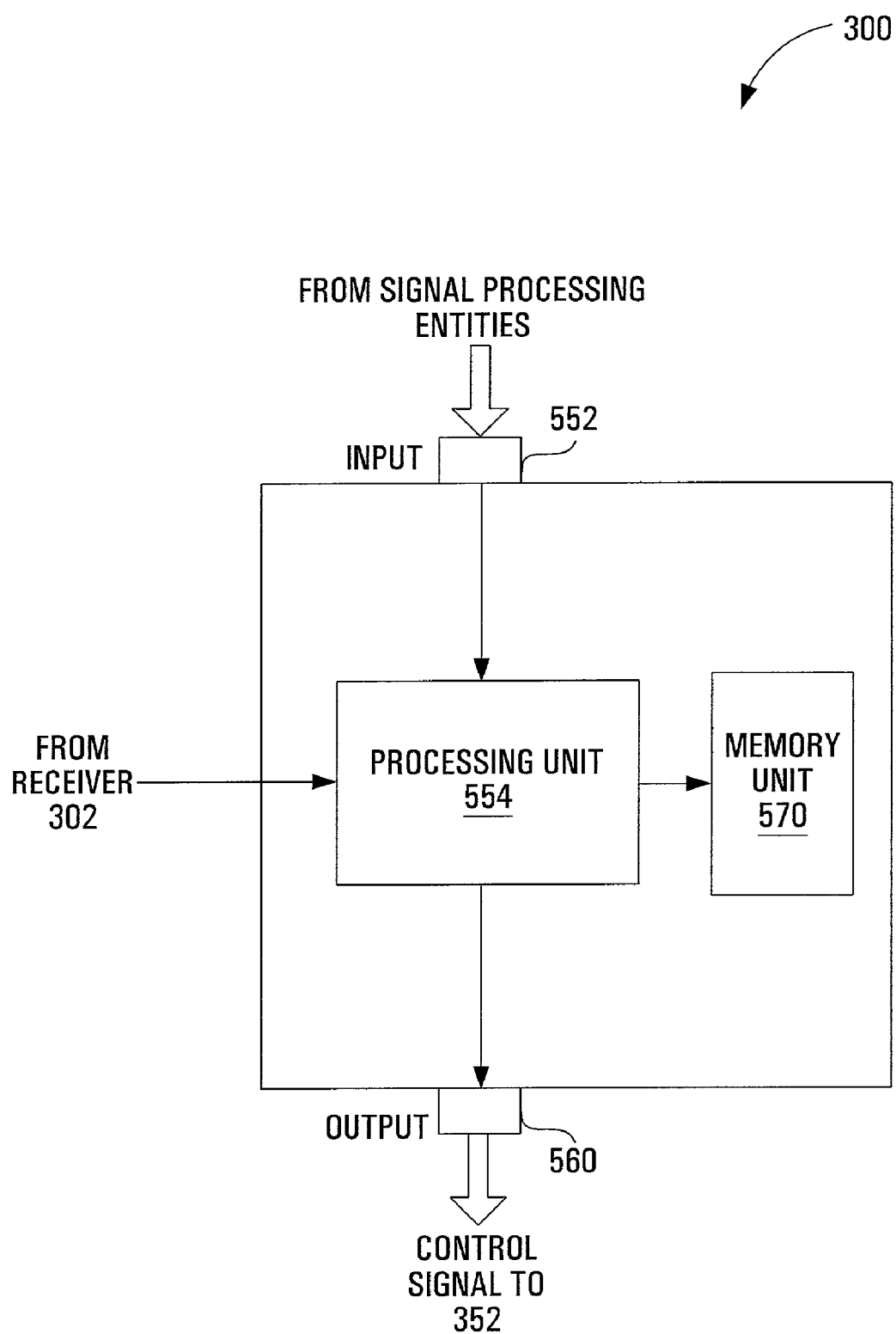
FIG. 5 is a detailed block diagram of the apparatus shown in FIG. 3 for controlling an operative setting of a communications link in accordance with a non-limiting example of implementation of the present invention.

The controller apparatus 300 is depicted in greater detail in FIG. 5. The apparatus 300 comprises an input 552 for receiving from at least one processing entity data elements indicative of audio quality in the communications link for the pre-processed audio signal and the post-processed audio signal. Alternatively, the input 552 is for receiving data elements indicative of measures of usefulness and/or effectiveness of respective processing operations performed by the at least one processing entity. The apparatus also comprises a processing unit 554 operatively connected to a memory unit 570 and an output 560.

The processing unit 554 generates a control data element for release at output 560 for transmission to the TFO processing unit 352 such as to selective enable the establishment of the bypass operative setting over a given communication link.

Selecting between an active (tandem) operative setting and a bypass (tandem free) operative setting includes an evaluation of the trade-off between the amount of additional degradation in the audio signal quality due to tandemming of vocoders(delay, distortion, and so on) versus the degradation resulting from the omission of applying signal processing operations (background noise, echo etc.). The criteria for the selection of the operative setting can be based on subjective and/or objective methods, or a mix of both. Examples methods used for selecting an operative setting are described below. Other methods for selecting the operative setting of a communication link on the basis of audio signal quality may be used without detracting from the spirit of the invention.

In a first example of implementation, objective measures of effectiveness of the processing operations implemented by the signal processing entities are used. Examples of measures of effectiveness for different processing operations are described below. It is to be understood that these are examples only as several other methods can be used without detracting from the spirit of the invention.

For each signal processing operation, the processing unit 554 derives an indicator indicating the degree of efficiency of the processing operation. The example below considers three processing operations namely echo reduction, signal level adjustment and noise reduction.

In a non-limiting example, the processing unit makes use of an echo return loss enhancement (ERLE) method to determine the effectiveness of an echo canceller in a communications link. Measures of the energy of the echo in the pre-processed and post-processed audio signal can be compared to derive an energy difference. The energy difference is then compared against a threshold to determine the degree of efficiency of the echo cancellor. Alternatively the measure of the energy of the echo in the pre-processed signal is compared to the energy of the pre-processed signal to derive an energy difference. The energy difference is then compared against a threshold to determine the degree of efficiency of the echo cancellor. In this alternative example, only the echo characteristic of the pre-processed audio signal is required. An indicator ($I_{echo}$) is released indicative of the degree of efficiency of the echo cancellor. In a non-limiting example, $I_{echo}$ is binary value such as 1 or 0 where 1 indicates that the echo canceller is of a sufficiently high degree of efficiency and 0 indicates that the echo canceller is not of a sufficiently high degree of efficiency. Other values for $I_{echo}$ may be used without detracting from the spirit of the invention.

In a non-limiting example, the processing unit 554 makes use of the AGC (AGC: Automatic gain control) value used by a level adjustment module to determine the effectiveness a level adjustment processing operation. For instance, the value of AGC can be compared against a threshold gain to determine the effect of the processing operation. For instance if the gain value is 1 or near 1 then the level adjustment does not significantly effect the signal and therefore could be omitted. The AGC can also be compared against a threshold to determine the degree of efficiency of the level adjustment module. An indicator ($I_{level}$) of the same type as $I_{echo}$ is released indicative of the degree of efficiency of the level adjustment module.

In a non-limiting example, the processing unit 554 makes use of the SNR (signal to noise ratio) value to determine the effectiveness a noise reduction processing operation. The SNR is compared against a threshold to determine the degree of efficiency of the noise reduction processing operation. An indicator ($I_{noise}$) of the same type as $I_{echo}$ is released indicative of the degree of efficiency of the noise reduction module.

The efficiency values of the processing operations are then compared to distortion values (D) associated to the encoder and decoder modules on a given communications link in order to determine the preferred operative setting for that given communications link. In a non-limiting example, the distortion values due to the encoder and decoder modules are stored in memory unit 570 and are indicative of distortion measurements of signal having different characteristics. Mathematically, this can be express as follows:

$$\text{If } w_1 I_{echo} + w_2 I_{level} + w_3 I_{noise} > D$$

then select active operative setting

Else select bypass operative setting

Where $w_i$'s are weights associated to the respective efficiency measures. It will be readily appreciated that certain processing operations may be weighted more than others. For instance the presence of echo in a signal is often considered to be a greater problem for the user than the presence of noise. Consequently, it may be desirable to weight the effectiveness of the echo canceller $I_{echo}$ more heavily than that of the noise reduction process $I_{noise}$ (i.e. $w_1 > w_3$).

A control data element indicative of the preferred operative setting (namely active or bypass) is then generated and released at the output 560.

In a second example of implementation, the processing unit 554 makes use of mean opinion scores (MOS) to determine a value for the degree of efficiency of the processing operations on a given communications link. Mean opinion scores are a way of formally establishing the subjective quality of the process. Mean opinion scores make use of a reference database against which a processing operation is tested. For each signal processing operation on a given communications link, the processing unit 554 derives an indicator indicating the mean opinion score associated to the processing operation.

For example, the mean opinion score (MOS) for an echo canceling operation may be expressed as a percentage of perceived improvement in audio signal quality when echo canceling is present (active operative setting) with reference to the echo when in the bypass setting. In a non-limiting example of implementation, the percentage of perceived improvement is stored in a database of mean opinion scores in memory unit 570. Measures of the energy of the echo in the pre-processed and post-processed audio signal can be compared to derive an energy difference. The energy difference is then used as an index in the mean opinion score database to derive the corresponding mean opinion score of the echo. An indicator $MOS_{echo}$ is released indicative of the degree of improvement in audio signal quality resulting from the use of the echo cancellor. Similar processing can be applied for the other processing operations such as the level adjustment and noise reduction to generate $MOS_{level}$ and $MOS_{noise}$.

Other methods for deriving a mean opinion score are well known in the art to which this invention pertains and will not be described further here.

The mean opinion scores of the processing operations are then compared to mean opinion scores for the improvement in signal quality due a reduction of the distortion associated to the encoder and decoder modules in order to determine the preferred operative setting on a given communications link. In a non-limiting example, the mean opinion scores for the improvement in signal quality due a reduction of the distortion are stored in memory unit 570. Mathematically, this can be express as follows:

$$\text{If } w_1 MOS_{echo} + w_2 MOS_{level} + w_3 MOS_{noise} > MOS_{Distortion}$$

then select active operative setting

Else select bypass operative setting

Where $w_i$'s are weights associated to the respective mean opinion scores. It will be readily appreciated that the mean opinion score of certain processing operations may be weighted more than others. For instance the presence of echo in a signal is often considered to be a greater problem for the user than the presence of noise. Consequently, it may be desirable to weight the mean opinion score of the echo canceller $MOS_{echo}$ more heavily than that of the noise reduction process $MOS_{noise}$ (i.e. $w_1 > w_3$).

A control data element indicative of the preferred operative setting (namely active or bypass) is then generated and released at the output 560.

In a third specific example of implementation, the processing unit implements a Transmission Quality Rating, R, as given by the ITU E-model (ITU-T Recommendation G.107). The contents of this document are hereby incorporated by reference. For a given situation, the processing unit 554 generates an estimate for the overall R-rating for the active (tandem) operative setting and the bypass (tandem free) operative setting on a given communications link. Whichever setting provides the highest value of R is selected as providing the setting providing the best voice quality.

In a non-limiting example of implementation, the Transmission Quality Rating R can be expressed mathematically as:

$$R = Ro - Is - Id - Ie$$

where Ro is indicative of a signal-to-noise ratio, including noise sources such as circuit noise and background noise; Is is a combination of all impairments which occur more or less simultaneously with the audio signal such as sidetone, quantizing distortion; Id represents the degradation in perceived quality of an audio communications link due to end to end delays and may include degradation caused by echo; and Ie represents impairments caused by signal processing devices such as low bit rate codecs. In the bypass (tandem free) operative setting, the Transmission Quality Rating R(tfo) can be expressed as follows:

$$R(tfo) = Ro(tfo) - Is(tfo) - Id(tfo) - Ie(tfo) \qquad (1)$$

while in the active (tandem) operative setting, the Transmission Quality Rating R(act) can be expressed as follows:

$$R(act) = Ro(act) - Is(act) - Id(act) - Ie(act) \qquad (2)$$

Figure 6:
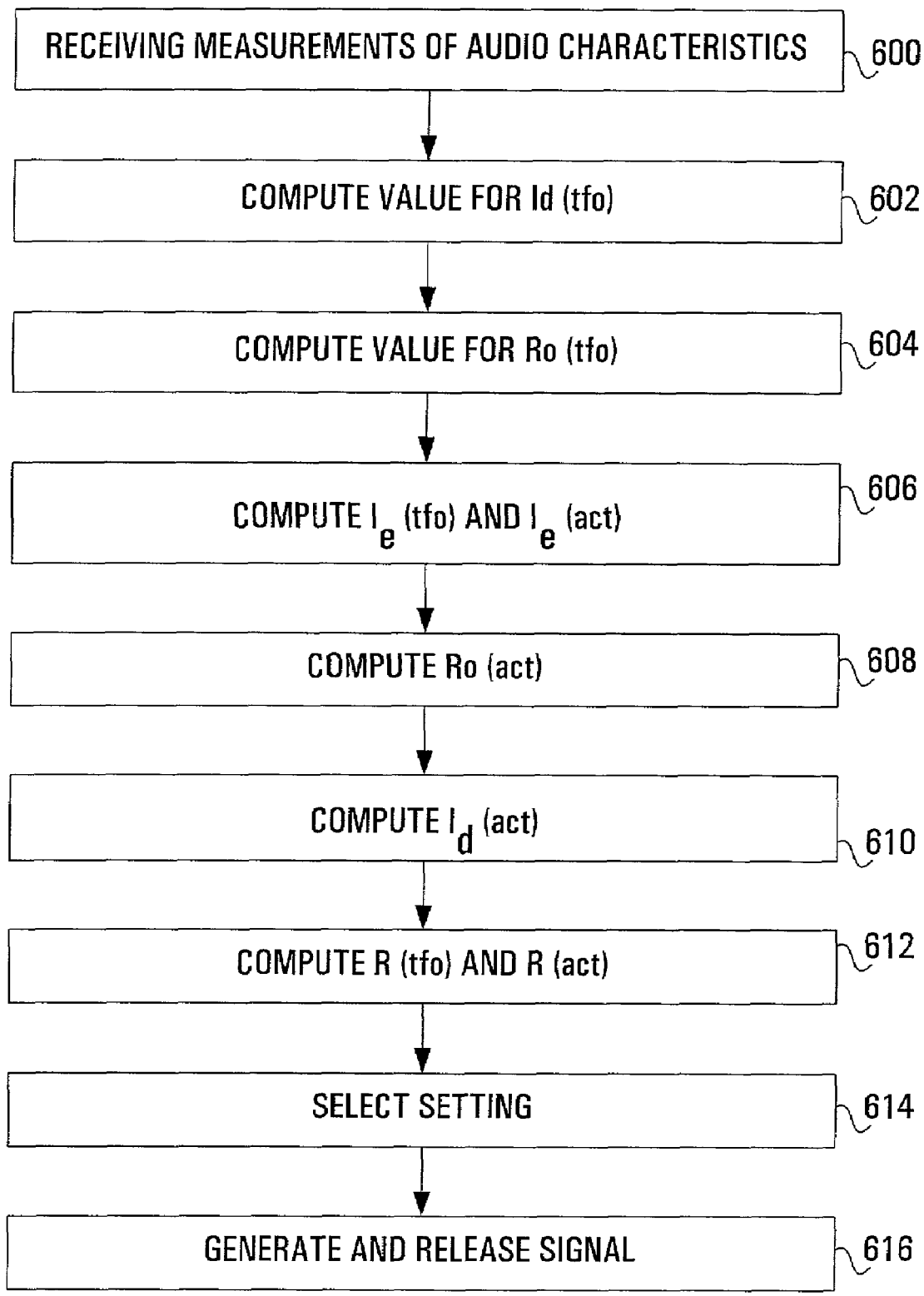
FIG. 6 is a flow chart of a process for selecting an operative setting of a communications link in accordance with a specific example of implementation of the present invention.

The process for calculating R(tfo) and R(act) is depicted in FIG. 6. At step 600, the apparatus receives from the signal processing entities A 120 B 304, C 310 and D 122 the measurement of audio characteristics of the audio signal in the active setting and in the bypass setting. The signal to noise ratios Ro(act) and Ro(tfo) are computed by the processing unit 554. At step 602 the processing unit 554, based on these measurements estimates the delay and echo return loss and uses the these to calculate Id (tfo). In a specific example, methods such as those described in the ITU E-model (ITU-T Recommendation G.107) can be used to calculate Id (tfo).

At step 604, the noise level and type of noise is evaluated and used to calculate Ro(tfo). At step 606, Ie(tfo) and Ie(act)

are calculated based on known characteristics of the encoder and decoder modules on the same communications link. The characteristics of the encoder and decoder modules are stored in a database residing in memory unit 570. In a specific example, methods such as those described in the ITU E-model (ITU-T Recommendation G.107) can be used to calculate Ie(tfo) and Ie(act).

At step 608, based on known characteristics of improvement in signal to noise ratio due to noise reduction, Ro(act) is calculated. The characteristics of improvement in signal to noise ratio due to noise reduction are stored in a database residing in memory unit 570 and are a measure of the effectiveness of a noise reduction processing operation in the communications link. In a non-limiting example, providing information regarding the past behavior of the noise reduction processing operation for signal having different characteristics are used to provide the known characteristics of improvement in the signal.

At step 610, based on known characteristics of improvement in echo performance due to the echo canceller, Id(act) is calculated. The characteristics of improvement in echo performance due to echo canceller are stored in a database residing in memory unit 570 and are a measure of the effectiveness of a noise cancellation processing operation in the communications link. In a non-limiting example, similarly to noise reduction, providing information regarding the past behavior of the echo canceller for signal having different characteristics are used to provide the known characteristics of improvement in the signal due to the echo canceller.

At step 612 R(tfo) and R(act) are calculated using default values for any parameters for which measurement were not available. In a non-limiting example, default values are such as those provided in the ITU E-model (ITU-T Recommendation G.107). Suitable values other than those provided by the ITU E-model can be used without detracting from the spirit of the invention. At step 614, the setting associated with the largest R is selected as the most desirable setting.

At step 616, a control data element indicative of the preferred operative setting (namely active or bypass) is then generated and released at the output 560.

The above-described functionality can be implemented on any suitable computing platform. The computing platform may be a unitary platform or may include components residing in different geographical locations without detracting from the spirit of the invention. In a non-limiting example, the processing unit 554 is implemented on a dedicated hardware platform suitable for communicating with a memory unit such as an EPROM, RAM or other memory device suitable for implementing memory unit 570.

Figure 7:
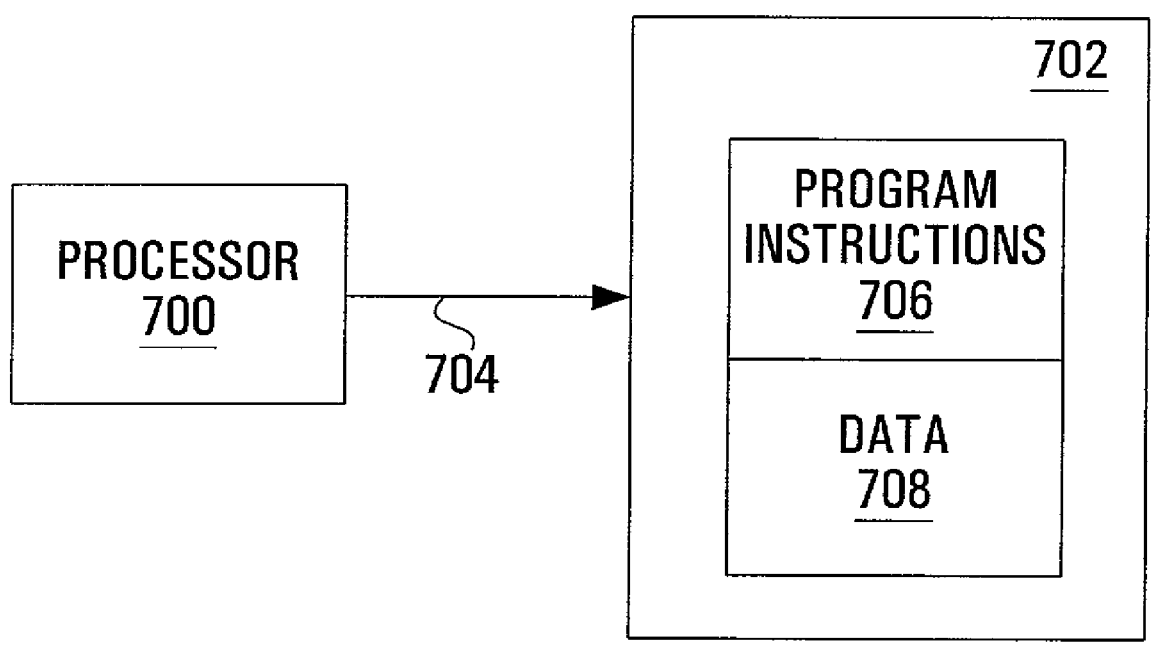
FIG. 7 is a block diagram of an apparatus for implementing the apparatus for controlling an operative setting of a communications link of FIG. 4 or 5 in accordance with a specific example of implementation of the invention.

The above-described method and system described in the specification can also be implemented on any suitable computing platform as shown in FIG. 7. Such a computing platform typically includes a processor 700 and a memory or computer readable medium 702 connected to the processor 700 by a data communication bus 704. The memory stores the data 708 and the instructions of the program element 706 implementing the functional blocks depicted in the drawings and described in the specification. In a specific example, the program element 706 when executing on the processor 700 implements the controller apparatus 300. In other specific example, the program element 706 when executing on the processor 700 implements the apparatus 301 for controlling an operative setting of a communications link. It will be readily appreciated that the processor 700 and the computer readable medium 702 may reside in different geographical locations, such as in a distributed network, without detracting from the spirit of the invention.

Although the present invention has been described in considerable detail with reference to certain preferred embodiments thereof, variations and refinements are possible without departing from the spirit of the invention. For example, the bypass operative setting is described in detail with reference to the TFO standard. It will be readily understood that different bypass techniques could be used and that the invention is not limited to the TFO standard. In a very specific example, the bypass receiver unit 302, the bypass transmitter unit 314, and processing unit (352) as well as the communication links 180 182 could be replaced by a computer network.

Therefore, the scope of the invention should be limited only by the appended claims and their equivalents.

The invention claimed is:

1. A method for controlling an operative setting of a communications link, the communications link being capable of acquiring plurality of operative settings, said method comprising:
   a) comparing audio quality in the communications link under at least two operative settings, said at least two operative settings including a first setting and a second setting, the first setting being a first active setting wherein the communications link transmits an audio signal subsequent to at least one processing operation on the audio signal, and the second setting being at least one of:
       i) a bypass setting wherein the communications link transmits an audio signal substantially unaltered; or
       ii) a second active setting wherein the communications link transmits an audio signal subsequent to at least one processing operation on the audio signal;
   b) selecting an operative setting from the at least two operative settings at least in part on the basis of the comparing in a);
   c) sending a control signal to at least one component in the communications link to cause the communications link to attempt to acquire the selected setting.

2. A method as defined in claim 1, wherein audio quality is a measure of actual audio quality of the communications link under the at least two operative settings.

3. A method as defined in claim 1, wherein audio quality is as estimate of audio quality of the communications link under the at least two operative settings.

4. A method as defined in claim 1, wherein the communications link comprises a plurality of components, said method comprising sending a control signal to the plurality of components in the communications link to cause the communications link to acquire the selected setting.

5. A method as defined in claim 1, wherein said method further comprises:
   a) deriving measurements of a certain characteristic of an audio signal for respective operative settings, the certain characteristic characterizing at least in part audio quality;
   b) comparing the measurements derived in a) to select an operative setting.

6. A method as defined in claim 5, wherein the certain characteristic is selected from the set consisting of a measure of echo, measure of delay, the signal level, a measure of the information loss and noise.

7. A method as defined in claim 5, wherein said method further comprises:
   a) deriving measurements for a set of characteristics of an audio signal for respective operative settings, each characteristic in the set of characteristics characterizing at least in part audio quality under a given operative setting;
b) comparing the measurements derived in a) to select an operative setting.

8. A method as defined in claim 7, wherein the set characteristic includes at least one characteristic selected from the set consisting of a measure of echo, measure of delay, the signal level, a measure of the information loss and noise.

9. A method as defined in claim 1, wherein the second setting is the bypass setting.

10. A method as defined in claim 9, said method comprising:
a) providing a data element indicative of a measure of effectiveness associated with the at least one processing operation on the audio signal;
b) selecting a setting at least in part on the basis of the measure of effectiveness of the at least one processing operation.

11. A method as defined in claim 10, wherein said measure of effectiveness is used to assess a degree of improvement in audio quality over an audio quality associated with the bypass setting.

12. A method as defined in claim 11, said method comprising selecting the first active setting when the measure of effectiveness is above a certain threshold of effectiveness.

13. An apparatus for controlling an operative setting of a communications link, the communications link being capable of acquiring a plurality of operative settings, said apparatus comprising:
a) an input for receiving data elements indicative of audio quality in the communications link under at least two operative settings, said at least two operative settings including a first setting and a second setting, the first setting being a first active setting wherein the communications link transmits an audio signal subsequent to at least one processing operation on the audio signal, and the second setting being at least one of,
  i) a bypass setting wherein the communications link transmits an audio signal substantially unaltered; or
  ii) a second active setting wherein the communications link transmits an audio signal subsequent to at least one processing operation on the audio signal;
b) a processing unit coupled to said input, said processing unit being operative for:
  i) comparing the data elements received at the input under the at least two operative settings;
  ii) selecting an operative setting from the at least two operative settings at least in part on the basis of the comparing in i);
  iii) generating a control data element suitable for causing the communications link to attempt to acquire the selected setting;
c) an output for releasing a control signal indicative of the control data element to at least one component in the communications link for causing the communications link to attempt to acquire the selected setting.

14. An apparatus as defined in claim 13, wherein the data elements indicative of audio quality are measures of actual audio quality of the communications link under the at least two operative settings.

15. An apparatus as defined in claim 13, wherein the data elements indicative of audio quality are estimates of audio quality of the communications link under the at least two operative settings.

16. An apparatus as defined in claim 13, wherein the data elements indicative of audio quality are measurements of a certain characteristic of an audio signal for respective operative settings, the certain characteristic characterizing at least in part audio quality, said processing unit being further operative for comparing the measurements to select an operative setting.

17. An apparatus as defined in claim 13, wherein the communications links comprises a plurality of components, said output being suitable for releasing a control signal to the plurality of components in the communications link to cause the communications link to acquire the selected setting.

18. An apparatus as defined in claim 16, wherein the certain characteristic is selected from the set consisting of a measure of echo, measure of delay, the signal level, a measure of the information loss and noise.

19. An apparatus as defined in claim 16, wherein the data elements indicative of audio quality are measurements for a set of characteristics of an audio signal for respective operative settings, each characteristic in the set of characteristics characterizing at least in part audio quality when the communication link is in a given operative setting, said processing unit being further operative for comparing the measurements to select an operative setting.

20. An apparatus as defined in claim 19, wherein the set characteristics include at least one characteristic selected from the set consisting of a measure of echo, measure of delay, the signal level, a measure of the information loss and noise.

21. An apparatus as defined in claim 13, wherein the second setting is the bypass setting.

22. An apparatus as defined in claim 21, said processing unit being operative for:
a) providing a data element indicative of a measure of effectiveness associated with the at least one processing operation on the audio signal;
b) selecting a setting at least in part on the basis of the measure of effectiveness of the at least one processing operation.

23. An apparatus as defined in claim 22, wherein said measure of effectiveness is used to assess a degree a degree of improvement in audio quality over an audio quality associated with the bypass setting.

24. An apparatus as defined in claim 23, said processing unit being operative for selecting the first active setting when the measure of effectiveness is above a certain threshold of effectiveness.

25. An apparatus for controlling an operative setting of a communications link, the communications link being capable of acquiring two operative settings namely a bypass setting and an active setting, when in the bypass setting the communications link transmitting an audio signal substantially unaltered, when in the active setting the communications link transmitting an audio signal subsequent to at least one processing operation on the audio signal, said apparatus comprising:
a) an input for receiving data elements indicative of an effectiveness of the at least one processing operation on the audio signal;
b) a processing unit coupled to said input, said processing unit being operative for:
  i) selecting one of the bypass setting and the active setting at least in part on the basis of the data elements received at the input;
  ii) generating a control data element suitable for causing the communications link to attempt to acquire the selected setting;

c) an output for releasing a control signal indicative of the control data element to at least one component in the communications link for causing the communications link to attempt to acquire the selected setting.

26. An apparatus as defined in claim 25, wherein the at least one processing operation is selected from the set consisting of echo cancellation, noise reduction, noise conditioning, information loss management and signal level adjustment.

27. A computer readable medium comprising a program element suitable for execution by a computing apparatus for controlling an operative setting of a communications link, the communications link being capable of acquiring a plurality of operative settings, said computing apparatus comprising:

a) a memory unit for storing the program element;
   b) a processor operatively coupled to said memory unit, said program element when executing on said processor being operative for implementing:
      i) an input for receiving data elements indicative of audio quality in the communications link under at least two operative settings, said at least two operative settings including a first setting and a second setting, the first setting being a first active setting wherein the communications link transmits an audio signal subsequent to at least one processing operation on the audio signal, and the second setting being at least one of:
         (1) a bypass setting wherein the communications link transmits an audio signal substantially unaltered; or
         (2) a second active setting wherein the communications link transmits an audio signal subseauent to at least one processing operation on the audio signal;
      ii) a processing unit for:
         (1) comparing the data elements received at the input under the at least two operative settings;
         (2) selecting an operative setting from the at least two operative settings at least in part on the basis of the comparing in (1);
         (3) generating a control data element suitable for causing the communications link to attempt to acquire the selected setting;
      iii) an output for releasing a control signal indicative of the control data element to at least one component in the communications link for causing the communications link to attempt to acquire the selected setting.

28. A computer readable medium as defined in claim 27, wherein the data elements indicative of audio quality are measures of actual audio quality of the communications link under the at least two operative settings.

29. A computer readable medium as defined in claim 27, wherein the data elements indicative of audio quality are estimates of audio quality of the communications link under the at least two operative settings.

30. A computer readable medium as defined in claim 27, wherein the data elements indicative of audio quality are measurements of a certain characteristic of an audio signal for respective operative settings, the certain characteristic characterizing at least in part audio quality, said processing unit being further operative for comparing the measurements to select an operative setting.

31. A computer readable medium as defined in claim 27, wherein the communications links comprises a plurality of components, said output being suitable for releasing a control signal to the plurality of components in the communications link to cause the communications link to acquire the selected setting.

32. A computer readable medium as defined in claim 31, wherein the certain characteristic is selected from the set consisting of a measure of echo, measure of delay, the signal level, a measure of the information loss and noise.

33. A computer readable medium as defined in claim 30, wherein the data elements indicative of a audio quality are measurements for a set of characteristics of an audio signal for respective operative settings, each characteristic in the set of characteristics characterizing at least in part audio quality when the communication link is in a given operative setting, said processing unit is further operative for comparing the measurements to select an operative setting.

34. A computer readable medium as defined in claim 33, wherein the set characteristics include at least one characteristic selected from the set consisting of a measure of echo, measure of delay, the signal level, a measure of the information loss and noise.

35. A computer readable medium as defined in claim 27, wherein the second setting is the bypass setting.

36. A computer readable medium as defined in claim 35, said processing unit being operative for:

a) providing a data element indicative of a measure of effectiveness associated with the at least one processing operation on the audio signal;
   b) selecting a setting at least in part on the basis of the measure of effectiveness of the at least one processing operation.

37. A computer readable medium as defined in claim 36, wherein said measure of effectiveness is used to assess a degree of improvement in audio quality over an audio quality associated with the bypass setting.

38. A computer readable medium as defined in claim 37, said processing unit being operative for selecting the active setting when the measure of effectiveness is above a certain threshold of effectiveness.

39. An apparatus for selectively enabling tandem-free operation of a communications link, the communications link comprising at least one functional stage operative to implement at least one processing operation on an audio signal, during tandem-free operation said at least one functional stage being disabled, said apparatus comprising:

a) an input for receiving data elements indicative of an effectiveness of the at least one processing operation on the audio signal;
   b) a processing unit coupled to said input, said processing unit being operative for processing the data element to generate a control data element suitable for causing the communications link to selectively enable tandem-free operation of the communications link;
   c) an output for releasing a control signal indicative of the control data element to the at least one functional stage in the communications link for selectively enabling tandem-free operation.

40. An apparatus for controlling an operative setting of a communications link, the communications link being capable of acquiring a plurality of operative settings, said apparatus comprising:
   a) means for receiving data elements indicative of audio quality in the communications link under at least two operative settings, said at least two operative settings including a first setting and a second setting, the first setting being a first active setting wherein the communications link transmits an audio signal subsequent to at least one processing operation on the audio signal, and the second setting being at least one of:
      i) a bypass setting wherein the communications link transmits an audio signal substantially unaltered; or
      ii) a second active setting wherein the communications link transmits an audio signal subsequent to at least one processing operation on the audio signal;
   b) processing means operative for:
      i) comparing the data elements received;
      ii) selecting an operative setting from the at least two operative settings at least in part on the basis of the comparing in i);
      iii) generating a control data element suitable for causing the communications link to attempt to acquire the selected setting;
   c) means for releasing a control signal indicative of the control data element to at least one component in the communications link for causing the communications link to attempt to acquire the selected setting.

* * * * *

UNITED STATES PATENT AND TRADEMARK OFFICE
CERTIFICATE OF CORRECTION

PATENT NO. : 7,076,316 B2  Page 1 of 1
APPLICATION NO. : 09/859640
DATED : July 11, 2006
INVENTOR(S) : Rafi Rabipour et al.

It is certified that error appears in the above-identified patent and that said Letters Patent is hereby corrected as shown below:

Claim 33 (column 18, line 13): should read --...indicative of audio quality...-- instead of "...indicative of a audio quality..."
Claim 38 (column 18, lines 43-44): should read --...for selecting the first active setting...--
Claim 40 (column 19, lines 5-6): should read --...operative settings including...-- instead of "...operative settingsincluding..."

Signed and Sealed this

Twenty-first Day of November, 2006

JON W. DUDAS
*Director of the United States Patent and Trademark Office*